United States Patent

Turbanti

[15] 3,700,775

[45] Oct. 24, 1972

[54] CHOLERETIC ACTIVITY

[72] Inventor: Luigi Turbanti, Via Bonaccorso Da Padule, 10, Pisa, Italy

[22] Filed: Sept. 11, 1970

[21] Appl. No.: 71,359

Related U.S. Application Data

[62] Division of Ser. No. 632,563, April 21, 1967, abandoned.

[52] U.S. Cl. .................................................424/317
[51] Int. Cl. .............................................A61k 27/00
[58] Field of Search......................................424/317

[56] References Cited

UNITED STATES PATENTS 3,034,961   5/1962   Pesson et al. ..............424/317
3,065,134   11/1962   Maillard et al. ...........424/317

OTHER PUBLICATIONS

J.A.C.S. Vol. 76 No. 9, May 12, 1954, pages 2285–2290

Primary Examiner—Albert T. Meyers
Assistant Examiner—Frederick E. Waddell
Attorney—Steinberg and Blake

[57] ABSTRACT

This invention provides 2-phenyl-2-hydroxy-cyclohexane-carboxylic acid and 2-cyclohexyl-2-hydroxy-cyclohexane-carboxylic acid as highly effective choleretic agents. The administration of effective dosages of these compounds by various routes results in marked choleresis.

3 Claims, No Drawings

CHOLERETIC ACTIVITY

CROSS REFERENCE TO RELATED APPLICATIONS

This application is a divisional of my copending application, Ser. No. 632,563, filed Apr. 21,1967, for "2-Hydroxycyclohexane-Carboxylic-2-Substituted Acids, Basic Esters Thereof AND Salts Showing A Choleretic And Antispactic Activity", now abandoned. A separate divisional application Ser. No. 71360, has been filed on Sept. 11, 1970, directed to the esters.

BACKGROUND OF THE INVENTION

The need for compounds having a high degree of choleretic activity is well known. It is particularly desirable to provide such compounds which have no side effects on the central nervous system, the vegetative nervous system, the arterial pressure, etc. There has been no way of determining in advance whether or not any particular compound would have these desired actions.

SUMMARY OF THE INVENTION

Generally speaking, the present invention provides for the administration of 2-phenyl-2-hydroxy-cyclohexane-carboxylic acid or 2-cyclohexyl-2-hydroxy-cyclohexane-carboxylic acid in order to achieve a marked choleretic action with a minimum of side effects.

It is a further object of the present invention to provide compositions of these compounds for the administration thereof by various routes, including parenteral administration, endoduodenal administration or oral administration, in order to achieve a choleretic action.

It is still another object of the present invention to provide compositions of these active ingredients with other therapeutically active ingredients to achieve a particularly marked choleretic activity.

Other objects and advantages of the present invention will be apparent from a further reading of the specification and of the appended claims.

With the above and other objects in view, the present invention mainly comprises the administration to one that requires choleresis of a choleretic-effective amount of a compound selected from the group consisting of 2-phenyl-2-hydroxy-cyclohexane-carboxylic acid, 2-cyclohexyl-2-hydroxy-cyclohexane-carboxylic acid and physiologically compatible salts thereof.

The general formula of these compounds may be expressed as follows:

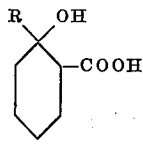

wherein R is either phenyl or cyclohexyl. The present invention contemplates not only the use of these compounds, but also the use of physiologically compatible salts thereof, such as the sodium salt for providing water solubility to permit the preparation of compositions for injection purposes.

According to the invention the above active compounds, which includes also the physiological compatible salts thereof may be mixed with pharmaceutically acceptable carriers such as lactose, sugar, microcrystalline gelatin, talc, magnesium stearate, sorbitol or the like to provide a highly effective choleretic composition.

According to a further embodiment of the present invention, the above active compounds may be mixed with a therapeutically active ingredient such as anthraquinone glycosides of cascara sagrada, rhubarb extract, artichoke extract, belladonna extract, vitamin PP, sodium 1-phenyl-2,3 -dimethyl-5-pyrazolone-4methylamino-metasulfonate or the like.

The compounds 2-phenyl-2-hydroxy-cyclohexane-carboxylic acid and 2-cyclohexyl-2-hydroxy-cyclohexane-carboxylic acid may be produced by reacting 2-hydroxy-methylcyclohexanone with a Grignard reagent in ether solution, isolating the corresponding alcohol 2-hydroxy-methylcyclohexan-1-ol from the ether reaction solution by vacuum distillation and oxidizing the latter with mixtures such as permanganate-sodium carbonate, chromic anhydride-acetic acid, chromic anhydride-pyridine, dilute nitric acid, or the like, to obtain the desired acid.

The 2-cyclohexyl compound may also be produced by reducing 2-phenyl-2-hydroxy-cyclohexane-carboxylic acid in an acetic acid solution in the presence of $PtO_2$ at 70° C. and a pressure of 20 atmospheres.

DESCRIPTION OF PREFERRED EMBODIMENTS

The following examples illustrate the production of the active compounds of this invention.

EXAMPLE 1

This Example illustrates the production of 2-phenyl-2-hydroxy-cyclohexane-carboxylic-acid.

25 g. of 2-hydroxy-methyl-cyclohexanone, diluted in 20 cc. of ether, were dropped into a vessel containing an ether suspension of phenyl-magnesium-bromide (prepared from 19.6 g of magnesium and 128 g. of bromobenzene in 300 cc. of ether according to usual techniques by stirring and external ice- cooling). The mixture was stirred for some time, then the magnesium compound was decomposed by pouring it carefully into water and ice; the magnesium hydroxide was dissolved in 50 cc. of a saturated solution of ammonium chloride, the ether portion was separated and the aqueous portion extracted with further ether.

Collected and dried ether extracts were evaporated and the residue vacuum distilled yielded 15 g. of a thick oil of b.p. $_{0.1-0.2\ Hg\ mm}$127°–135° C.

This product crystallized by dissolving in ether and re-precipitation with petroleum ether yielded, 7 g. of 1-phenyl-2-hydroxy-ethylene-cyclohexan-1-ol. m.p.(Kofler) 81°–83° C.

The thus obtained product was dried and finely powdered, and then suspended in 1.4 l. of an aqueous solution of 14 g. of $KMnO_4$ and 7 g. of $Na_2CO_3$, and the suspension was thoroughly stirred for one day.

After filtering off of the $MnO_2$ thus formed, a small amount of $Na_2SO_3$ was added till the violet coloration disappeared; $MnO_2$ was filtered again and the alkaline solution was acidified with concentrated HCl.

After one day standing in a refrigerator, the product was filtered and washed with water, thus yielding 5 g. of 2-phenyl-2-hydroxy-cyclohexane-carboxylic acid, m.p. (Kofler) 143°–145° C.

EXAMPLE 2

This Example illustrates the production of 2-cyclohexyl-2-hydroxy-cyclohexane-carboxylic acid.

5.6 g. of 2-phenyl-2-hydroxy-cyclohexane-carboxylic acid were dissolved in 75 cc. of glacial acetic acid and autoclave reduced in the presence of 0.1 g. of platinum oxide under hydrogen pressure of 22 kg cm$^2$ at a temperature of 70°–80° C.

Hydrogen absorption being completed, the solution was filtered and evaporated to one-fifth of its volume and cooled in a refrigerator. The precipitate was filtered and washed with water and then crystallized from ligroin, thus yielding 4 g. of 2-cyclohexyl-2-hydroxy-cyclohexane-carboxylic acid, m.p. (Kofler) 122°–124° C.

A marked choleretic activity, that has been distinctly proved by experiments conducted on three animal species (rat, cat and dog) is shown below for both 2-phenyl-2-hydroxy-cyclohexane carboxylic-, and 2-cyclohexyl-2-hydroxy-cyclohexane carboxylic-acids.

An increase up to 100-150% in the bile secretion, when compared with that occurring before treatment, was caused by doses of 25–50 mg/kg, administered by endoduodenal or oral route. The maximum activity is observed after 30–60 minutes following the administration, and the reversion to normal secretion gradually occurs after 2–3 hours.

The activity of compounds according to the invention is shown in more detail in the Table 1 below, where the average values of secreted bile volumes, as measured on five groups of 6 rats each, are tabulated as a function of time and in comparison with rats not treated with the compounds of the invention.

TABLE 1

| Hours | LG.30142 bile milliliters $\sigma$ | LG.30143 bile milliliters $\sigma$ | Control Group bile milliliters $\sigma$ |
|---|---|---|---|
| 0 | 0.45 ± 0.20 | 0.50 ± 0.10 | 0.48 ± 0.12 |
| 1 | 1.18 ± 0.30 | 1.10 ± 0.25 | 0.45 ± 0.08 |
| 2 | 0.65 ± 0.18 | 0.55 ± 0.12 | 0.40 ± 0.14 |
| 3 | 0.58 ± 0.10 | 0.48 ± 0.18 | 0.42 ± 0.10 |
| 4 | 0.50 ± 0.05 | 0.48 ± 0.22 | 0.35 ± 0.25 |
| 5 | 0.45 ± 0.15 | 0.45 ± 0.25 | 0.35 ± 0.30 |

$\sigma$ = Average quadratic deviation
LG 30142 = 2-phenyl-2-hydroxy-cyclohexane carboxylic acid. LG 30143 = 2-cyclohexyl-2-hydroxy-cyclohexane carboxylic acid.

Moreover, as may be observed from Table 2, the choleretic activity of the compounds in question, is higher than that of some of the most active choleretic compounds that can be presently found on the market.

TABLE 2

| Hrs | Cholipin | Verecolene | 2-phenyl-2-hydroxy-cyclohexane carboxylic acid | Controls |
|---|---|---|---|---|
|  | bile millimeters |  |  |  |
| 0 | 0.42 | 0.39 | 0.45 | 0.48 |
| 1 | 0.65 | 0.50 | 1.18 | 0.45 |
| 2 | 0.50 | 0.58 | 0.65 | 0.40 |
| 3 | 0.37 | 0.47 | 0.58 | 0.42 |
| 4 | 0.32 | 0.40 | 0.50 | 0.35 |
| 5 | 0.30 | 0.34 | 0.45 | 0.35 |

Cholipin (prior art compound) = 1-phenyl-pentanol. Verecolene (prior art compound) = -(1-hydroxy-4-phenyl-cyclohexyl)-butirric acid.

The compounds of the invention are active even when administered by parenteral route; thus, e.g., when administered by intravenous route, the activity of even smaller doses, down to 2–4 mg/kg, is already apparent a few minutes after the injection.

The increase in the bile secretion keeps pace with an increase in the contents of bile solid components, as e.g., the bile acids and salts, the bilirubin and cholesterol.

No undesired side effects are caused by either of the tested compounds, namely 2-phenyl-2-hydroxy-cyclohexane carboxylic acid, 2-cyclohexyl-2-hydroxy-cyclohexane carboxylic acid on the CNS (Central Nervous System) and on the VSN (Vegetative Nervous System. The arterial pressure, the ECG (electrocardiogram) and the respiration are not modified at all. No activity is exerted on the gastroentero system, either in vitro or in vivo. The actions of adrenalin, noradrenalin, serotonin, acetylcholine, histamine and barium chloride are neither hindered, nor emphasized. The rate of intestinal transit is not modified.

The LD 50 of mice are as follows:

|  | LG 30142 | LG 30143 |
|---|---|---|
| by intravenous route | 920 mg/kg (842–1005) | 930 mg/kg (860–1004) |
| by intraperitoneal route | 1260 mg/kg (1162–1965) | 1310 mg/kg (1180–1890) |
| by mouth | 1950 mg/kg (1814–2096) | 1940 mg/kg (1780–2050) | and the LD 50 of rats are:

|  | LG 30142 | LG 30143 |
|---|---|---|
| by intraveous route | 335 mg/kg (239–469) | 365 mg/kg (250–505) |
| by intraperitoneal route | 1150 mg/kg (1085–1219) | 1160 mg/kg (1100–1290) |
| by mouth | 3320 mg/kg (3091–3565) | 3280 mg/kg (3010–3460) |

Before having the compounds according to the invention clinically tested, they were submitted to a thorough chronic toxicity survey on laboratory animals (rats, rabbits and dogs), with doses ranging from 10, up to 150 times greater than the therapeutic dose, and administering each single dose to two groups of 20 male, and of 20 female animals, respectively. Experiments were conducted on rats by administering doses of 50 – 150 and 300 mg/kg/ day by mouth thereto, for 1 – 3 and 6 months, whereafter no significant alterations were noticed in the biochemical-functional and anatomo-histological examinations.

Even in the experiments conducted on dogs, to which doses of 10–30–100 and 300 mg/kg day were administered for six months, no toxic effects attributable to the compounds were noticed, except for the animals treated with the exceptionally high doses of 300 mg/kg, which however only exhibited a mild turbid- and turbid-vacuolar degeneration of the liver.

The toxicity tests in pregnancy, conducted on female rabbits of New Zealand White breed, very sensitive to teratological agents, proved that no negative influence is exerted by 2-phenyl-2-hydroxy-cyclohexane carboxylic acid or 2-cyclohexyl-2-hydroxy-cyclohexane carboxylic acid, at doses of 10 and 30 mg/kg by mouth, on the pregnancy, embryogenesis and foetusgenesis.

CLINICAL EXPERIMENTATION

The clinical tests of 2-phenyl-2-hydroxy-cyclohexane carboxylic acid were conducted by the use of the active ingredient in the form of electuaries of 0.250 g., each containing:

Composition (1)

| | | |
|---|---|---|
| 2-Phenyl-2-hydroxy-cyclohexane-carboxylic acid | 30 | mg |
| Lactose | 60 | mg |
| Starch | 10 | mg |
| Microcrystalline cellulose | 10 | mg |
| Talc | 5.5 | mg |
| Magnesium stearate | 3 | mg |
| sugar q.s. to | 250 | mg | in the case of 2-cyclohexyl-2-hydroxy-cyclohexane carboxylic acid, a composition was utilized, in the form of 0.250 g electuaries, each containing:

Composition (2)

| | |
|---|---|
| 2-Cyclohexyl-2-hydroxy-cyclohexane carboxylic acid | 30 mg |
| Lactose | 60 mg |
| Starch | 10 mg |
| Microcrystalline cellulose | 10 mg |
| Talc | 5.5 mg |
| Magnesium stearate | 3 mg |
| Sugar q.s. to | 250 mg |

The composition (1) was tested on 40 male and female patients, from 20 to 60 years of age, subdivided into the nosologic groups as stated below, according to their morbid conditions:

| | Number of Patients |
|---|---|
| Slight and middle hepatic insufficiency | 15 |
| Chronic cholecystitis and cholangitis | 14 |
| Calculosis of biliary ducts | 8 |
| Stypsis and multiple etiology | 3 |

The composition (2) was tested on a further group of 36 patients, subdivided as stated below, according to clinical picture:

| | |
|---|---|
| Slight and middle hepatic insufficiency | 17 |
| Calculosis of biliary ducts | 6 |
| Chronic cholecystitis and cholangitis | 9 |
| Stypsis and multiple etiology | 4 |

The diagnostic criterium was based on the subjective and objective symptomatology (inappetence, sickness, post-prandial dullness, stypsis, epigastric painfulness, sub-icterus), as well as on trustworthy reports obtained from the customary instrument and laboratory investigations (routine examinations of faeces, urines and peripheral blood, hematochemical examinations, cholecystographies, XR abdomen, rose-Bengal test, F.S.B., etc.).

A variable posology was followed in the course of investigations, i.e. from 2 to 4 electuaries per day and for periods ranging from 10 to 30 days, according to morbid conditions, excluding any other drug which might interfere with the therapeutic activity of tested preparation.

The following evaluation was made as a criterion of the therapeutic activity of the tested drug:

— Total regression of objective and subjective symptomatology, strengthened by the negative reports of pathologic laboratories. Evaluation: +++.

— Improvement of objective and subjective symptoms and of laboratory reports. Evaluation: ++.

— Persistency of symptoms. Evaluation: 0.

At the end of treatment with composition (1) the following results were obtained for each of the considered nosologic groups

| Patients suffering from | Results +++ | ++ | 0 | Total patients |
|---|---|---|---|---|
| Slight and middle hepatic insufficiency | 10 | 2 | 3 | 15 |
| Chronic cholecystitis and cholangitis | 13 | 1 | 0 | 14 |
| Calculosis of biliary ducts | 4 | 1 | 3 | 8 |
| Stypsis | 4 | 0 | 2 | 3 |

The results stated below were obtained at the end of treatment with the composition (2):

| Patients suffering from | Results +++ | ++ | 0 | Total patients |
|---|---|---|---|---|
| Slight and middle hepatic insufficiency | 10 | 4 | 3 | 17 |
| Calculosis of biliary ducts | 3 | 1 | 2 | 6 |
| Chronic cholecystitis and cholangitis | 6 | 2 | 1 | 9 |
| Stypsis | 1 | 1 | 2 | 4 |

From the above results, as obtained with both composition (1) and (2), it may be safely inferred that the most intensive therapeutic activity was attained in the group of patients suffering from chronic cholecystitis and cholangitis, were in 70–90 percent of the cases a resolution of symptomatology — inveterate and resisting in many cases to conventional therapies — was observed.

This would lead to the conclusion that said drugs, in addition to their biligenetic activity, are also able to interfere with the many and not easily identifiable factors which concur to uphold the symptomatologic picture.

Interesting results have also been attained on patients suffering from slight and middle hepatic insufficiency, thereby attesting to the pharmacological assumptions related to re-equilibring activity of hepatic cell functions.

Not always reliable results have been conversely attained on patients suffering from stypsis due to multiple etiology, as well as on patients suffering from calculosis of biliary ducts. At any rate, the compounds according to the invention have been perfectly tolerated by all patients, since in no case were secondary effects on the digestive activity, or alterations in the hemato-chemical reports observed.

Additional tests were carried out wherein a duodenal sounding was taken of the bile secretion before and after an administration per rectum of 2-phenyl-2-hydroxy-cyclohexane carboxylic acid. Use was made of vials containing 60 mg of the compound, in the form of its sodium salt, dissolved in water. The same tests were performed on a group of 20 healthy persons, having an unprejudiced epato-biliary function, and on a further group of 20 persons, which showed more or less manifest symptoms of hepatic insufficiency, with positivity of serine lability tests, increase in the bilirubidemia, impaired albumin/globulin ration, etc.

A quantitative increase of bile secretion, statistically significant in respect of basal values, was ascertained in both groups of persons. Moreover, very small and wholly irrelevant changes were observed in the pH values, and in the concentration of bilirubine in the bile samples taken before and after the administration of the drug, thereby confirming that a "real" choleretic effect, and not a mere hydrochloretic action, is induced by the same drug. Even in the course of such tests no secondary effects were observed on the different systems.

The following examples further illustrate the production of compositions containing the active ingredients of the invention.

EXAMPLE A

Pills are prepared each weighing about 0.250 grams, of the following ingredients:

| | |
|---|---|
| 2-phenyl-2-hydroxy-cyclohexane-carboxylic acid | 30 mg |
| Lactose | 60 mg |
| Starch | 10 mg |
| Cellulose | 10 mg |
| Talc | 5.5 mg |
| Magnesium stearate | 3 mg |
| Saccharose q.s. to | 250 mg |

The usual dosage of these pills is 1 to 2 pills three times a day, at meal time, to achieve a choleretic action.

EXAMPLE B

This example illustrates the production of pills containing the choleretic active ingredient of the present invention and also containing cholagogic active ingredients.

Pills each weighting about 0.55 g are prepared by normal tabletting procedures of the following ingredients:

| | |
|---|---|
| 2-phenyl-2-hydroxy-cyclohexane-carboxylic acid | 30 mg |
| Anthraquinone glycosides of cascara sagrada | 40 mg |
| Dry belladonna extract | 5 mg |
| Gesilite (hydrated silica gel) | 20 mg |
| Aerosil (SiO$_2$) | 10 mg |
| Lactose | 70 mg |
| Potato Starch | 70 mg |
| Polyvinylpyrrolidone | 20 mg |
| Pharmaceutical Avicel (mycrocristalline cellulose) | 20 mg |
| Talc | 10 mg |
| Magnesium stearate | 5 mg |
| Saccharose q.s. to | 550 mg |

The normal dosage of these pills is 1 – 2 pills three times a day at meal time to achieve a choleretic and cholagogic action.

EXAMPLE C

This example illustrates the production of a choleretic and cholagogic active syrup.

A syrup is prepared in which each 100 cc contains the following:

| | |
|---|---|
| 2-cyclohexyl-2-hydroxy-cyclohexane-carboxylic acid | 0.500 g |
| Sodium bicarbonate | 0.190 g |
| Anthraquinone glycosides of cascara sagrada | 0.500 g |
| Fluid rhubarb extract | 3 g |
| Fluid artichoke extract | 1 g |
| Fluid belladonna extract (0.25%) | 0.225 g |
| Methyl p-hydroxybenzoate | 0.180 g |
| Vitamin PP | 0.50 g |
| Propyl p-hydroxybenzoate | 0.020 g |
| Sorbitol 100% | 45 g |
| Saccharose | 15 g |
| Orange essence | 0.018 g |
| Lemon essence | 0.006 g |
| Ethyl alcohol 95% | 5 cc |
| Distilled water q.s. to | 100 cc |

The normal dose of this syrup is 1 – 2 spoonsfull (10 cc) three times a day at meal time.

While the invention has been illustrated in particular with respect to certain specific choleretic compositions and treatments to achieve a choleretic action, it is apparent that variations and modifications of the invention can be made within the spirit of what has been disclosed herein.

What is claimed is:

1. A method of achieving choleresis, which comprises administering to one requiring the same a choleretic-effective amount of a compound selected from the group consisting of 2-phenyl-2-hydroxy-cyclohexane-carboxylic acid, 2-cyclohexyl-2-hydroxy-cyclohexane-carboxylic acid, and physiologically compatible salts thereof.

2. The method of claim 1 wherein said compound is 2-phenyl-2-hydroxy-cyclohexane-carboxylic acid.

3. The method of claim 1 wherein said compound is 2-cyclohexyl-2-hydroxy-cyclohexane-carboxylic acid.

* * * * *

UNITED STATES PATENT OFFICE
CERTIFICATE OF CORRECTION

Patent No. 3,700,775          Dated October 24, 1972

Inventor(s) Luigi Turbanti

It is certified that error appears in the above-identified patent and that said Letters Patent are hereby corrected as shown below:

[30]      Foreign Application Priority Data

April 29, 1966     Italy ....17,335

Signed and sealed this 13th day of March 1973.

(SEAL)
Attest:

EDWARD M. FLETCHER, JR.          ROBERT GOTTSCHALK
Attesting Officer                 Commissioner of Patents